United States Patent
Chiarandini et al.

(10) Patent No.: US 10,362,349 B1
(45) Date of Patent: Jul. 23, 2019

(54) DETECTING CHANNEL SIMILARITY BASED ON CONTENT REUSE

(71) Applicant: Google LLC, Mountain View, CA (US)

(72) Inventors: Luca Chiarandini, Zurich (CH); Johan Georg Granstrom, Kilchberg (CH)

(73) Assignee: Google LLC, Mountain View, CA (US)

( * ) Notice: Subject to any disclaimer, the term of this patent is extended or adjusted under 35 U.S.C. 154(b) by 10 days.

(21) Appl. No.: 15/377,905

(22) Filed: Dec. 13, 2016

(51) Int. Cl.
*H04N 21/2668* (2011.01)
*H04L 29/06* (2006.01)
*G06K 9/00* (2006.01)
*H04N 21/2743* (2011.01)
*H04N 21/25* (2011.01)
*G06K 9/62* (2006.01)
*H04N 21/234* (2011.01)
*G06F 17/30* (2006.01)

(52) U.S. Cl.
CPC ..... *H04N 21/2668* (2013.01); *G06F 17/3082* (2013.01); *G06K 9/00758* (2013.01); *G06K 9/6215* (2013.01); *H04L 65/4084* (2013.01); *H04N 21/23418* (2013.01); *H04N 21/251* (2013.01); *H04N 21/2743* (2013.01)

(58) Field of Classification Search
CPC ............ G06F 17/3082; G06K 9/00758; G06K 9/6215; H04N 21/251; H04N 21/2668; H04N 21/23418; H04L 21/251
USPC .................................................. 382/209, 218
See application file for complete search history.

(56) References Cited

U.S. PATENT DOCUMENTS

| | | | | |
|---|---|---|---|---|
| 9,679,069 | B2 * | 6/2017 | Kocks | G06F 17/30867 |
| 2014/0324864 | A1 * | 10/2014 | Choe | G06F 17/30823 |
| | | | | 707/737 |
| 2015/0339395 | A1 | 11/2015 | Kocks et al. | |
| 2018/0101540 | A1 * | 4/2018 | Stoop | G06F 17/3084 |

* cited by examiner

*Primary Examiner* — Daniel G Mariam
(74) *Attorney, Agent, or Firm* — Byrne Poh LLP

(57) ABSTRACT

A method, system, and computer program instructions detect and score video channels based on content reuse. Matches between two videos occur when one video reuses a segment of video or audio content from another video. A video graph stores information about videos, channels the videos belong to, and their matches with other videos. Channels are given similarity scores based on their similarity to a video, channel, or group of channels. Similarity scores are calculated using information about video matches from the video graph.

35 Claims, 11 Drawing Sheets

DETECTING CHANNEL SIMILARITY BASED ON CONTENT REUSE

BACKGROUND

Field of Art

This description generally relates to video processing, and more specifically to detecting content reuse among videos.

Description of the Related Art

Online systems store, index, and make available for consumption various forms of media content to Internet users. This content may take a variety of forms; in particular, video content, including streaming video is widely available across the Internet. Online video systems allow users to view videos uploaded by other users. Popular online content systems for videos include YouTube™. These online video systems may contain thousands or millions of video files, making management of these video files an extremely challenging task. Some challenges include diversifying video recommendations and detecting abusive videos.

Videos may be grouped into channels either manually by an online system user or automatically by a computer system. For example, a channel might include a collection of videos about animals. Although some information about channel similarity can be incorporated manually by humans, it is not always the case that a user uploading a video provides reliable and complete information about related videos. Propagating similarities through channels containing multiple videos is even more difficult and time consuming. Accordingly, an improved technique is needed for detecting video channels containing similar and/or repeated content.

SUMMARY

In one embodiment, a method detects and scores similarities between video channels. The method receives a query set of one or more videos. The method obtains, from a video graph based on the query set, a set of video matches, where video matches contain at least a threshold duration of identical content to at least one video in the query video set. The method identifies a channel associated with each video in the video match set and determines a similarity score between each video in the query video set and each video in the video match set. The method aggregates the similarity scores by channel to generate a channel score for each channel associated with one or more of the videos in the video match set and sends the channels scores to the user or entity that submitted the original query.

In one embodiment, a system detects and scores similarities between video channels. The system includes a computer processor and a non-transitory computer-readable storage medium storing computer executable components configured to cause the computer processor to perform the following steps. The system receives a query set of one or more videos. The system obtains, from a video graph based on the query set, a set of video matches, where video matches contain at least a threshold duration of identical content to at least one video in the query video set. The system identifies a channel associated with each video in the video match set and determines a similarity score between each video in the query video set and each video in the video match set. The system aggregates the similarity scores by channel to generate a channel score for each channel associated with one or more of the videos in the video match set and sends the channels scores to the user or entity that submitted the original query.

In one embodiment, a non-transitory computer-readable medium having instructions stored thereon that, in response to execution, cause a system including a processor to perform steps for detecting and scoring similarities between video channels. The medium includes instructions for receiving a query set of one or more videos. The medium includes instructions for obtaining, from a video graph based on the query set, a set of video matches, where video matches contain at least a threshold duration of identical content to at least one video in the query video set. The medium includes instructions for identifying a channel associated with each video in the video match set and determining a similarity score between each video in the query video set and each video in the video match set. The medium includes instructions for aggregating the similarity scores by channel to generate a channel score for each channel associated with one or more of the videos in the video match set and sending the channels scores to the user or entity that submitted the original query.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
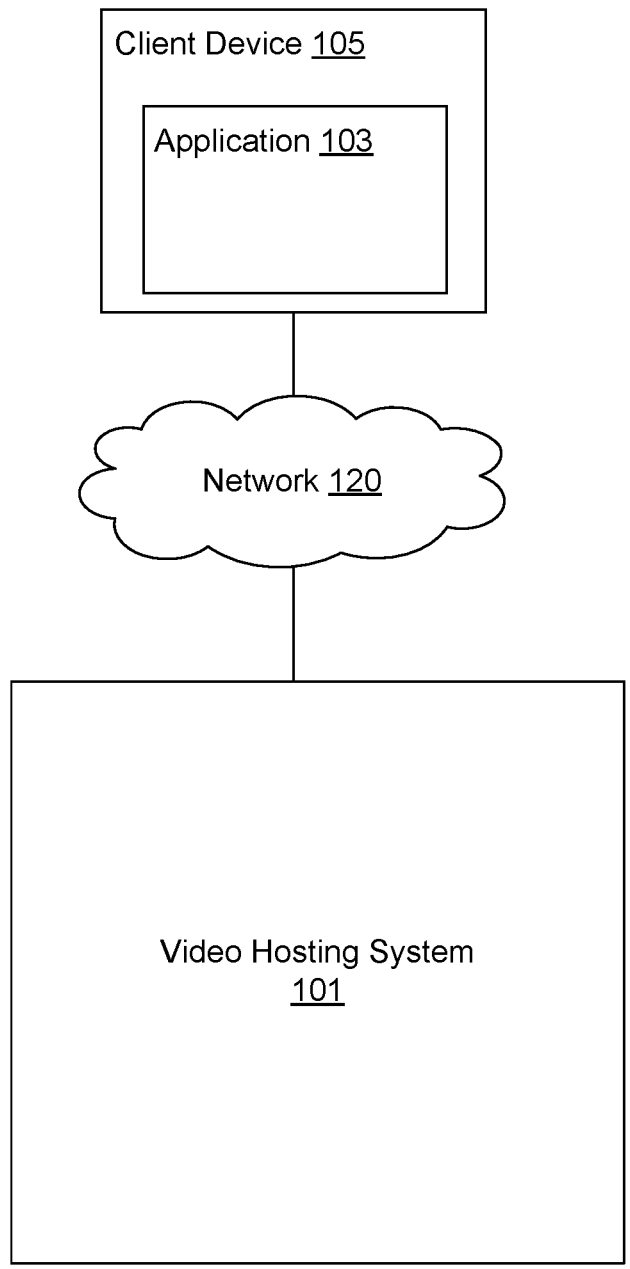
FIG. 1 is a high level block diagram of a video hosting system, according to an embodiment.

FIG. 1 is a high-level block diagram of a video hosting system, according to an embodiment. FIG. 1 illustrates a video hosting system 101 and a client device 105 connected by a network 120. A user can use the client device 105 to access videos contained within the video hosting system 101. A client can access a video from the video hosting system 101 by browsing a catalog of videos, conducting searches using keywords, reviewing play lists from other clients or a system administrator (e.g., collections of videos forming channels), or viewing videos associated with particular client groups (e.g., communities). Additionally, in some embodiments, the video hosting system 101 is adapted to receive videos for storage in order to enable the sharing of the videos with other clients.

The client device 105 communicates with the video hosting system 101 over the network 120. In one embodiment, the client device 105 is a personal computer executing a software application 103 such as a web browser such as GOOGLE CHROME that allows a client to view web pages and videos provided by the video hosting system 101. In another embodiment, the client device 105 is a mobile device such as a smartphone or tablet computer, or even a personal computer, that executes an application which may also be a web browser or which may be designed to provide specific functionality for accessing the video hosting system 101. The client device 105 may also be another network-capable device such as a car entertainment system, television "set-top box," etc. Although FIG. 1 illustrates only a single client device 105, it should be understood that many user devices (e.g., millions) can communicate with the video hosting system 101 at any time. Only one client device 105 is illustrated in order to simplify and clarify the present description.

The network 120 represents the communication pathways between the client device 105 and the video hosting system 101. In one embodiment, the network 120 is the Internet, but may also be any network, including but not limited to wired or wireless networks, cloud computing networks, private networks, virtual private networks, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The video hosting system 101 allows clients to access video content via searching and/or browsing interfaces. The sources of videos can be from client uploads of videos, searches or crawls of other websites or databases of videos, or the like, or any combination thereof. For example, in one embodiment a video hosting system 101 can be configured to allow for client uploads of content; in another embodiment a video hosting system 101 can be configured to only obtain videos from other sources by crawling such sources or searching such sources in real time.

A suitable video hosting system 101 for implementation of the system is the YOUTUBE™ website. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

Video Hosting System

Figure 2:
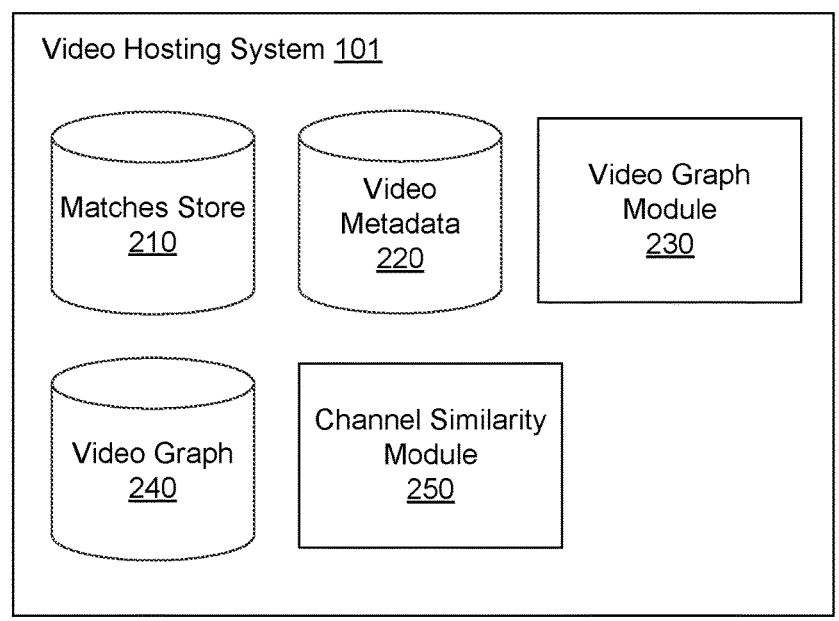
FIG. 2 is a high-level block diagram illustrating a detailed view of the video hosting system, according to an embodiment.

FIG. 2 is a high-level block diagram illustrating a detailed view of the video hosting system 101, according to an embodiment. As shown in FIG. 2, the video hosting system 101 includes several modules. Those of skill in the art will recognize that other embodiments can have different modules than the ones described here, and that the functionalities can be distributed among the modules in a different manner. In addition, the functions ascribed to the video hosting system 101 can be performed by multiple systems. As illustrated, the video hosting system 101 includes a matches store 210, a video metadata store 220, a video graph module 230, a video graph store 240, and a channel similarity module 250.

Matches Store

The matches store 210 stores information about matching sections of multiple videos. A "match" or "video match" is a segment of a video that is either the same as a segment of another video (this may be referred to as segment "reuse"), or that is sufficiently similar to a segment of another video so that for purposes of the matches store 210 in this description the segments are considered to be matches. A match can refer to reused video content and/or reused audio content from a video. For example, a video showcasing clips from the top ten ferret videos of all time would match with each of the ten ferret videos from which those clips were obtained. Data about matches includes: an identification of which videos contain matches, times at which matches between videos occur in each of the videos, match duration, and whether the matches are of audio content, video content, or both audio and video content. The match store 210 can be kept online, or can be stored in an offline repository.

Video Metadata

The video metadata store 220 is a storage system where video files and their metadata are stored by the video hosting system 101. A video may be accompanied by associated metadata, such as an identification number, title, author, tags, descriptions, icons, thumbnail views, comments, and a rating. The video metadata store 220 may also contain information regarding the categorization of a video into one or more channels. A channel is a collection of videos that have been associated with one another. A channel can be created by an administrator, a user, or by a system process that automatically categorizes videos into groups. For example, a user might create a channel that contains videos of cats, or an administrator might upload a series of entries to a video blog and categorize them into a channel. The video metadata store 220 also stores videos that are not associated with a channel, as not every video is necessarily a member of a channel.

Video Graph Module

The video graph module 230 aggregates information from the matches store 210 and the video metadata store 220 to construct a video graph 240. The video graph 240 represents a filtered version of the matches that have been identified between videos in the matches store 210. The filtering of the matches is a separate and subsequent step to an initial process of determining whether a match should be included in the matches store 210. The video graph module 230 filters the matches from the matches store 210 to select for matches that exceed a predetermined threshold value of some matching metric and includes the remaining matches in the video graph 240. Some examples of matching metrics include: the length of the match, the content of the match, and/or some confidence level that a true match has been detected, as indicated in the matches store 210. This filtering reduces noise that might be associated with relatively short video or audio segments that are detected as matching. For example, the video graph module 230 might include only matches that have a some predetermined duration, such as 48 seconds.

The video graph 240 is expected to change over time as videos are added, edited, or removed from the system. Accordingly, the video graph module 230 updates the video graph 240. The video graph 240 can be updated according to a predetermined schedule (e.g., once a day, twice a week, etc.). The video graph 240 can also be updated whenever one or more videos are added to the video metadata store 220.

Example Video Graph

Figure 3:
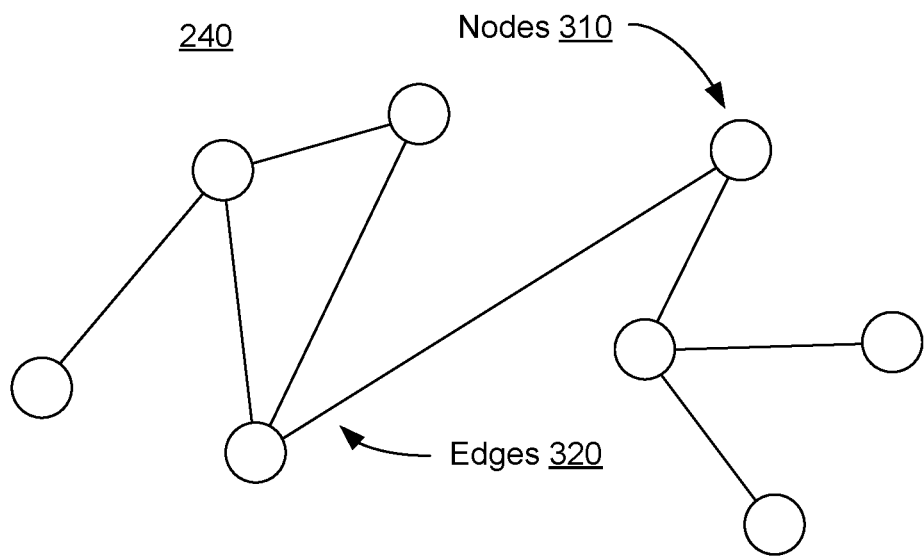
FIG. 3 is an example illustration of a video graph, according to an embodiment.

FIG. 3 is an example illustration of the video graph 240, according to an embodiment. The video graph 240 can be represented as a set of nodes 310 connected by edges 320. Each node 310 in the video graph 240 represents a single video. Nodes 310 contain additional information about the videos they represent. The additional information includes information extracted from the video metadata store 220 (e.g., a channel to which the video belongs). Edges 320 in the video graph 240 connect nodes 310 that are associated with videos that match with each other. For example, an edge 320 may connect two videos which share one or more segments of audio and/or video content. Edges 320 additionally contain information about how much audio and/or visual content two videos share, such as the duration of the match. Edges 320 in the video graph 240 optionally include information about the time at which the matches occur within the videos. The video graph 240 only includes edges 320 that represent matches that exceed some threshold value of a predetermined matching metric.

Channel Similarity Module

Returning to FIG. 2, the channel similarity module 250 computes similarity scores that represent to what extent channels are similar to the videos (and therefore channels with which the videos are associated) in a query set. The computation of similarity scores, as performed by the channel similarity module 250, is separate from the processes of identifying matches to store in the matches store 210 and the of filtering the matches in the matches store 210 to construct the video graph 240. A query set is one or more videos provided as input to a query that is submitted to and/or received by the channel similarity module 250. A query set can include a single video, one channel of multiple videos, or multiple channels. Queries may be submitted to the channel similarity module 250 from a user via a client device 105, and/or from other modules of the video hosting system 101.

A similarity score compares one or more properties of a channel with one or more properties of the videos in a query set to identify whether the channel is similar to the query set and/or contains identical content. There are a number of such properties that can be considered, alone or in combination for use in determining similarity scores. These include at least, identical segments of videos in the channel and the query set, the identical segments having at least a threshold length and/or properties based on the duration of such identical segments. Other properties may also be used in the calculation of a similarity score including a number of views of videos that are associated with both the channel and the query set, the comments associated with such videos, likes, dislikes, and the average view duration of the videos. Several ways to generate a similarity score are described below in the "Similarity Scoring" section.

Based on the query set, the channel similarity module 250 determines a set of video matches from the video graph 240. The set of video matches includes videos that are connected to videos in the query set by edges 320 of the video graph 240. The channel similarity module 250 identifies a channel associated with each video in the set of video matches and determines a similarity score between each video in the query set and each video in the match set. The channel similarity module 250 generates a channel score for each channel by aggregating the determined similarity scores based on the channels with which videos from the match set are associated. The channel similarity module 250 sends one or more of the channel scores (e.g., the top 15 similar channels) to the device or entity that submitted the original query set. Different kinds of queries may be used to indicate the original query set. Some examples of possible query formats are subsequently detailed.

Queries

Single Video Query

Figure 4A:
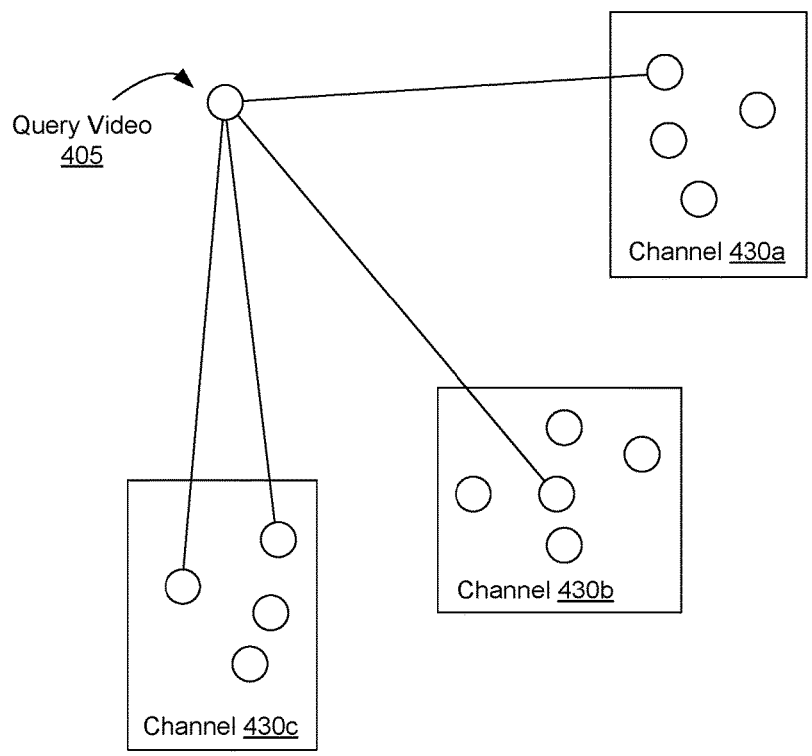
FIG. 4A illustrates an example of a single video query, according to an embodiment.

FIG. 4A illustrates an example of a single video query, according to an embodiment. A single video query occurs when the query set for a query contains only one query video 405. For a single video query, the channel similarity module 250 determines a set of one or more channels that include at least one video that is represented in the video graph 240 by a node that shares an edge with the node representing the query video 405. In the example shown in FIG. 4A, individual videos are represented as circles and channels are represented as boxes containing the videos that are associated with each channel. A similarity score is calculated for each of the channels in the set. Some subset of the set of channels may be selected based on the similarity scores and returned in response to the single video query. In FIG. 4A, channel 430*a* contains one video that matches the query video 405, channel 430*b* contains one video that matches the query video 405, and channel 430*c* contains two videos that match the query video 405 so the channel similarity module 250 would assign a similarity score to each of these channels and a resulting list of similar channels might include channel 430*a*, channel 430*b*, and channel 430*c*, for example in a ranked order based on the similarity scores.

Single Channel Query

Figure 4B:
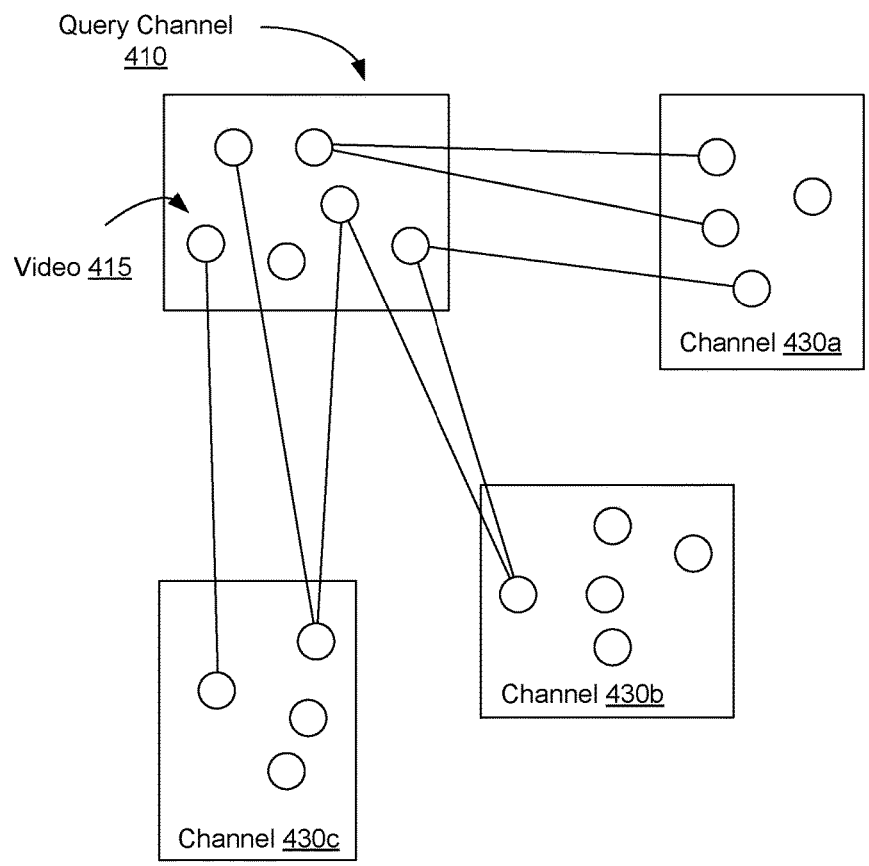
FIG. 4B illustrates an example of a single channel query, according to an embodiment.

FIG. 4B illustrates an example of a single channel query, according to an embodiment. Single channel queries are also sometimes referred to as "multiple video queries" because they occur when a channel containing multiple videos is submitted to the channel similarity module 250 as the query set and can also occur when a set of multiple videos is submitted even if the set of videos is not registered or otherwise identified as a channel by the video hosting system 101. For a single channel query, the channel similarity module 250 determines a set of one or more channels that include at least one video that is represented in the video graph 240 by a node that shares an edge with at least one node representing a video 415 within a query channel 410. In FIG. 4B, as in FIG. 4A, individual videos, such as video 415, are represented as circles, and channels are represented as boxes containing the videos that are associated with the channel. A similarity score is calculated for each of the channels in the determined set of one or more channels. Some subset of the determined set of channels may be selected based on the similarity scores and returned in response to the single video query. For example, in FIG. 4B, those channels that contain videos with matches to at least one of the videos in the query channel 410, such as channel 430a, channel 430b, and channel 430c, are assigned similarity scores by the channel similarity module 250.

Multiple Channel Query

Figure 4C:
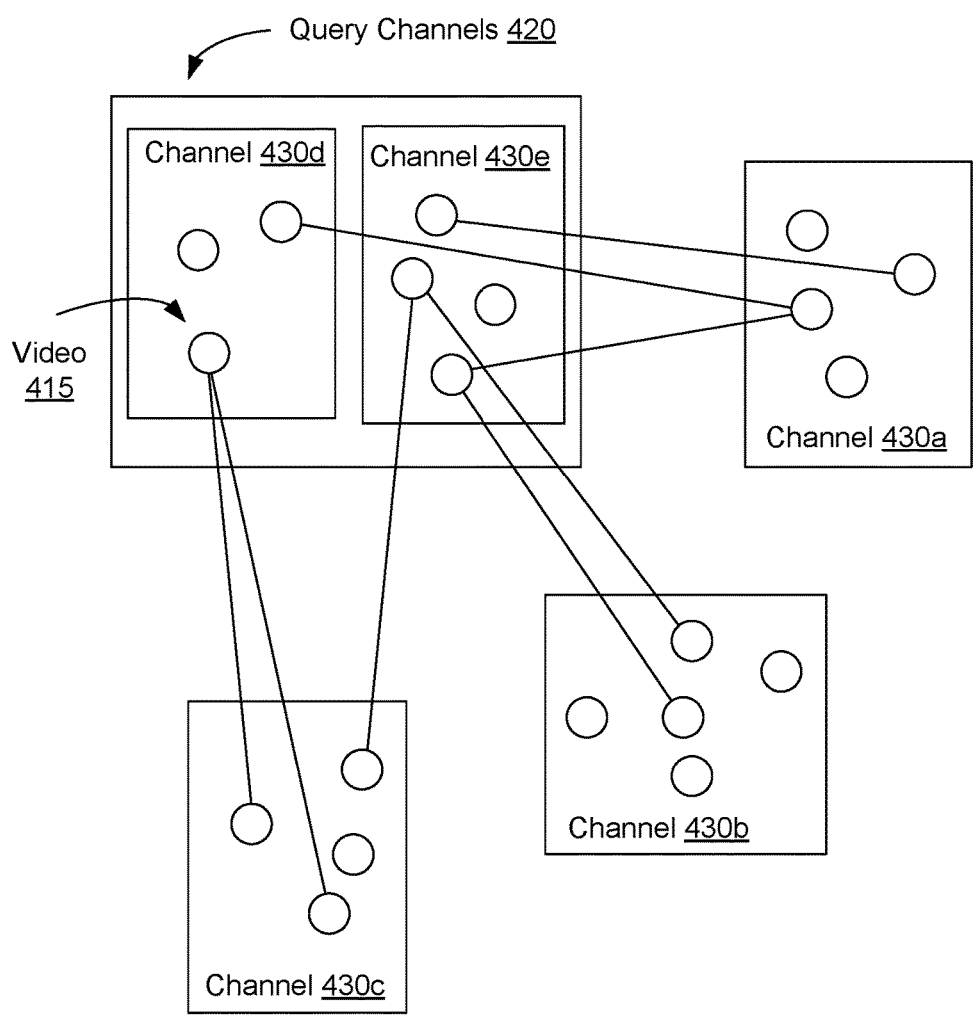
FIG. 4C illustrates an example of a multiple channel query, according to an embodiment.

FIG. 4C illustrates an example of a multiple channel query, according to an embodiment. A multiple channel query occurs when two or more query channels 420 are included in the query set. For example, in FIG. 4C, the query set includes channel 430d and channel 430e. In a multiple channel query, the channel similarity module 250 determines a set of channels (such as channel 430a, channel 430b, and channel 430c) that each include at least one video that is represented in the video graph 240 by a node that shares an edge with at least one of the nodes that represent videos that are associated with at least one of the query channels 420 (i.e., channel 430d or channel 430e). A similarity score is calculated for each of the channels in the determined set of channels. Some subset of the determined set of channels may be selected based on the similarity scores and returned in response to the single video query.

Similarity Scoring

Similarity scores between videos and/or between query sets and channels can be calculated in a variety of ways. Some of the ways that similarity scores are calculated include counting the number of distinct matching videos (e.g., that have at least one matching segment, or however else matching is determined), summing function values calculated for pairs of matching videos, and multiplying function values calculated for pairs of matching videos. Example methods for determining similarity scores are now described in further detail, however these are merely exemplary and in alternative embodiments different methods for calculating similarity scores may be used.

Number of Distinct Matching Videos

One method for determining a similarity score for a channel given a set of query videos is counting the number of distinct videos that match at least one of the query videos in the channel. In this case, the number of edges 320 in the video graph 240 between a channel and the query set (i.e., number of matches) are summed and the resulting sum is assigned as the similarity score for the channel. This method of calculating similarity scores is advantageous because it is robust. It does not depend on the content of any single video to determine whether a channel as a whole is similar to a given query set, but instead relies on multiple videos to contain matches to members of the query set in order to increase the score of the channel.

Sum of Evidence

Another method for determining similarity scores is summing over the results of function values. This method for determining similarity scores uses the general formula:

$$S=\Sigma_{i,j}\Pi_k(1+f_k(v_i,v_j))-1 \qquad (1)$$

where S is the similarity score, $v_i$ is a video from the query set, $v_j$ is a video from another channel, and where $f_k>0$ is a function that compares $v_i$ and $v_j$. There may be as many as k functions used in a calculation. In one example, each k functions compares $v_i$ and $v_j$ in some way such that larger function values indicate increased video similarity. For example, each different k function may analyze a different property of the videos for similarity. The method of summing over a sequence of functions favors large channels in the similarity score results because large channels contain more videos whose matches can contribute to the final sum. However, relative to the number of distinct matching videos technique discussed in the prior paragraph, the sum of evidence method takes into account the degree of similarity between individual videos in the channel and individual videos in the query set when determining the similarity scores.

Product of Evidence

Similarity scores may also be determined by multiplying over the results of function values. This method for determining similarity scores uses the general formula:

$$S=\Pi_{i,j}\Pi_k(1+f_k(v_i,v_j))-1 \qquad (2)$$

where S is the similarity score, $v_i$ is a video from the query set, $v_j$ is a video from another channel, and where $f_k>0$ is a function that compares $v_i$ and $v_j$. There may be as many as k functions used in a calculation. In one example, each of the k functions compares $v_i$ and $v_j$ such that larger function values indicate increased video similarity. For example, each different k function may analyze a different property of the videos for similarity. The method of multiplying over a sequence of functions favors channels with the most consistent matches because positive evidence has a stronger reinforcing effect. Like the sum of evidence method, the product of evidence method takes into account the degree of similarity between individual videos in the channel and individual videos in the query set when determining the similarity scores. However, the product of evidence method differs from the sum of evidence method in that multiplying the function values makes the larger function values have more weight in the resulting score.

Possible Functions

As introduced above, a variety of possible functions $f_k$ that compare or otherwise incorporate the videos $v_i$ and $v_j$ can be used in the general formulas for summing over evidence and multiplying over evidence. Also as introduced above, generally these functions may operate on any known aspect of information about a video or the channel that a video has been categorized to be a part of (and which is under consideration in the calculation being performed at that moment). Several example functions are now described in further detail.

The functions can be chosen such that the similarity score is indicative of the connectivity between the two channels. That is, the chosen functions calculate the number of existing edges between two channels over the maximum possible number of edges between the two channels. This calculation can be represented by functions $f_1$ and $f_2$ such that:

$$f_1(v_i, v_j) = \frac{1}{|\text{channel}(v_i)| \cdot |\text{channel}(v_j)|} \qquad (3)$$

where $v_i$ is a video in the query set, $v_j$ is a video from another channel, and the notation |x| refers to the number of videos in the indicated channel (i.e., the size of the channel), and:

$$f_2(v_i, v_j) = \begin{cases} 1, & \text{edge exists between } v_i \text{ and } v_j \\ 0, & \text{no edge exist between } v_i \text{ and } v_j \end{cases} \qquad (4)$$

The rationale for these calculations for connectivity is that higher scores will be assigned to channels that have many matches (i.e., that share edges in the video graph 240) with the videos (and therefore with channels with which the videos are associated) in the query set.

The functions can also be chosen to calculate the similarity score based on a match duration ratio. The match duration ratio is similar to the connectivity calculation except that the match duration ratio accounts for the fraction of a video that matches with another video, rather than counting every match between two videos equally. This calculation can be represented by functions $f_1$ and $f_2$ such that:

$$f_1(v_i, v_j) = \frac{1}{|\text{channel}(v_i)| \cdot |\text{channel}(v_j)|} \quad (5)$$

where $v_i$ is a video in the query set, $v_j$ is a video from another channel, and the notation Ix' refers to the number of videos in the indicated channel, and:

$$f_2(v_i, v_j) = \frac{\text{fraction of } v_i \text{ that matches } v_j}{\text{length}(v_i)} \quad (6)$$

In this case, $f_2$ will be a value between 0 and 1, where a 0 value indicates no match between the videos and a 1 indicates that video $v_i$ is completely duplicated within video $v_1$. The rationale for this calculation of match duration is that channels with many matches and/or lengthy matches with the videos of the query set will receive higher similarity scores.

Another set of functions can be chosen to calculate a match view-duration ratio. The match view-duration ratio relates to the fraction of a video that matches with a video in the query set and also accounts for the popularity of the channel (i.e., the number of times videos in a channel have been viewed. This calculation can be represented by functions $f_1$ and $f_2$ such that:

$$f_1(v_i, v_j) = \frac{\text{views}(v_i) \cdot \text{views}(v_j)}{\text{views}(\text{channel}(v_i)) \cdot \text{views}(\text{channel}(v_j))} \quad (7)$$

where $v_i$ is a video in the query set, $v_j$ is a video from another channel, views (v) is the number of times video v has been accessed (e.g., watched) by a user of the video hosting system 101, and views(channel(v)) is the number of times a video from the channel containing video v has been accessed.

$$f_2(v_i, v_j) = \frac{\text{fraction of } v_i \text{ that matches } v_j}{\text{length}(v_i)} \quad (8)$$

In this case, as with the functions for determining match duration ratio, $f_2$ will be a value between 0 and 1, where a 0 value indicates no match between the videos and a 1 indicates that video $v_i$ is completely duplicated within video $v_1$. The rationale for this calculation of match view-duration ratio is that popular channels (e.g., those channels that are viewed the most) that also have many matches and/or lengthy matches with the videos in the query set will receive higher similarity scores.

Functions besides those described herein may also be used to calculate similarity scores. Some examples of additional possible schemes for calculating similarity scores include functions that account for the position of matches within videos (e.g., by weighting matches at the beginning of videos more heavily), and weighting the importance of different videos within the query set according to some metric.

Applications

Identifying a list of channels that are similar to a query set using a single video query, a single channel query, or a multiple channel query is useful in many situations. The method of determining similar channels can be used in situations including, but not limited to, abuse detection, increasing search diversity, increasing recommendation diversity, recommending videos for a user to watch next, and signal smearing. These processes are described in additional detail herein.

Figure 5A:
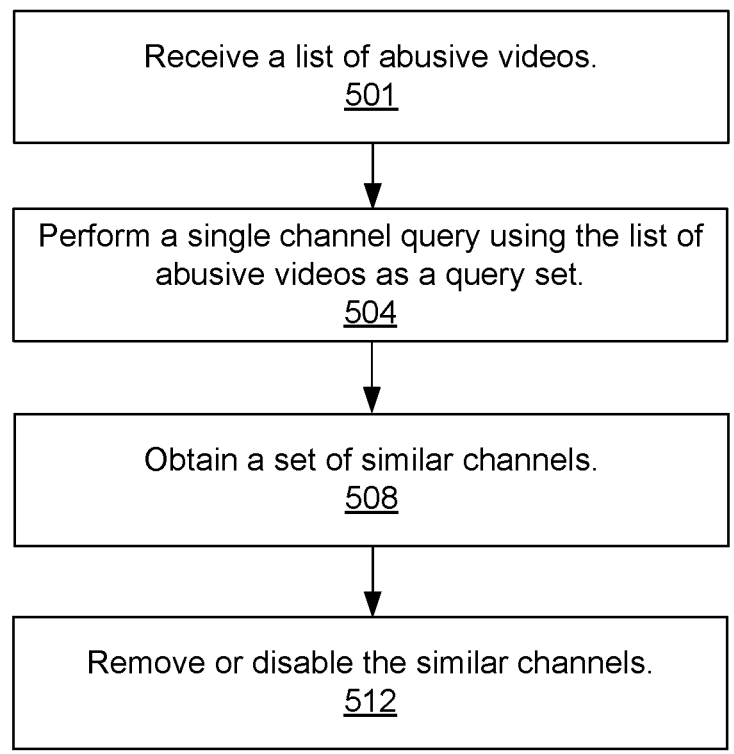
FIG. 5A illustrates an example process of using a single channel query to facilitate abuse detection, according to an embodiment.

FIG. 5A illustrates a process of using a single channel query to facilitate abuse detection, according to an embodiment. The video hosting system 101 receives 501 a list of abusive videos. For example, a system administrator might submit a list of videos that are flagged as abusive in the form of an internal abusive video channel. Alternatively, the video hosting system 101 can automatically compile a list of videos that users have flagged as abusive into an abusive video channel. The channel similarity module 250 performs 504 a single channel query using the abusive video channel as the query set. The video hosting system 101 obtains 508 a set of channels that are similar to the abusive video channel. The video hosting system 101 removes 512 or disables channels in the obtained set of channels that are similar to the abusive video channel. For example, if a channel is identified as being similar to an abusive video channel, the video hosting system 101 can disable monetization for the channel.

Figure 5B:
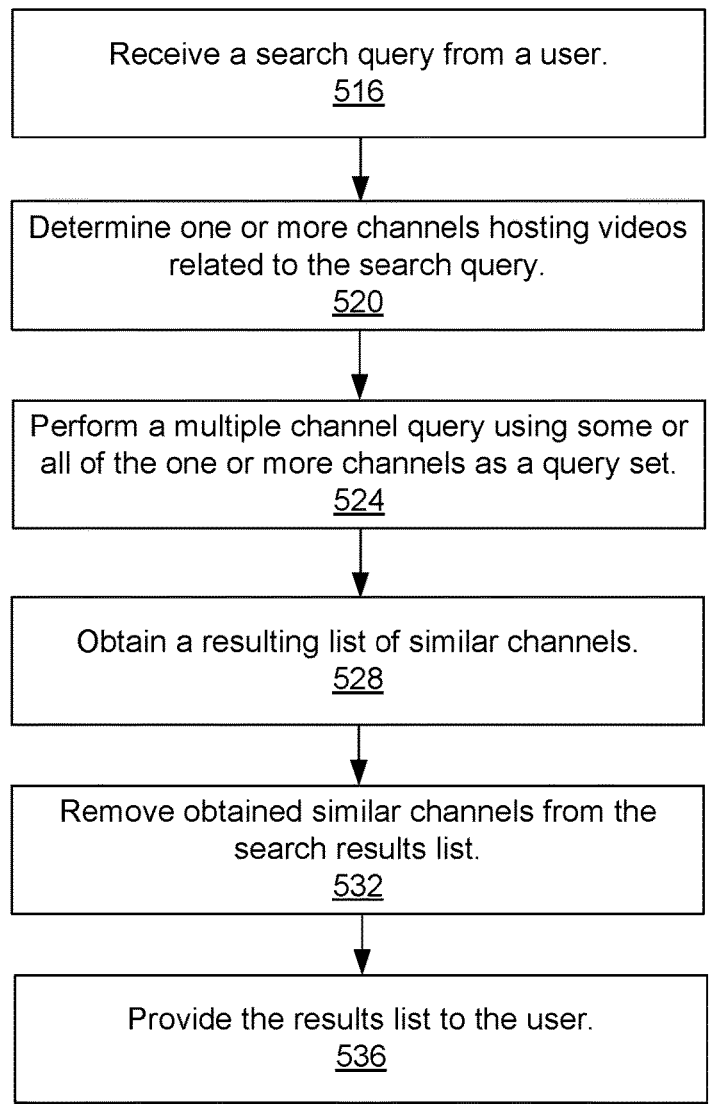
FIG. 5B illustrates an example process of using a multiple channel query to increase search diversity, according to an embodiment.

FIG. 5B illustrates a process of using a multiple channel query to increase search diversity, according to an embodiment. The video hosting system 101 receives 516 a search query from a user. For example, a user can submit a search query for "cats" to the video hosting system, requesting a list of videos about cats. The video hosting system 101 determines 520 one or more channels hosting videos that are related to the search query. The channel similarity module 250 performs 524 a multiple channel query using some or all of the channels hosting videos related to the search query as a query set. The video hosting system subsequently obtains 528 a list of channels similar to the channels that host related videos. For example, The list of channels related to the search query might include many channels with videos of famous house cats. When these channels are used as a query set in a multiple channel query, the resulting list of similar channels might include channels that repeat portions of the house cat videos. To increase search diversity, the video hosting system removes 532 similar channels from the search results list and provides 536 the resulting list to the user. This method increases search diversity because it avoids showing videos containing repeated content to the user in search results.

Figure 5C:
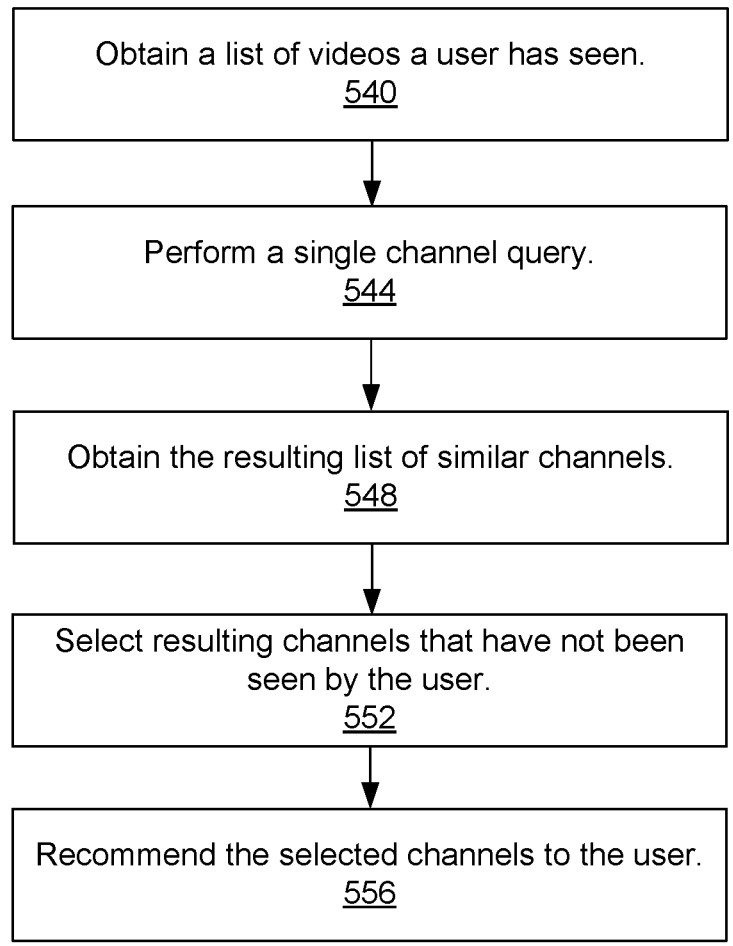
FIG. 5C illustrates an example process of using a single channel query to increase recommendation diversity, according to an embodiment.

FIG. 5C illustrates a process of using a single channel query to increase recommendation diversity, according to an embodiment. The video hosting system obtains 540 a list of videos that a user has seen. The channel similarity module 250 performs 544 a single channel query using the list of videos seen previously by the user as a query set. The video hosting system 101 obtains 548 a resulting list of similar channels and selects 552 channels that are not included in the resulting list for recommending to the user. The video hosting system 101 recommends 556 the selected channels to the user, for example by listing the channels in a user interface when the user accesses the video hosting system 101. This process increases recommendation diversity by avoiding recommendations of channels that are similar to channels that a user has seen before.

Figure 5D:
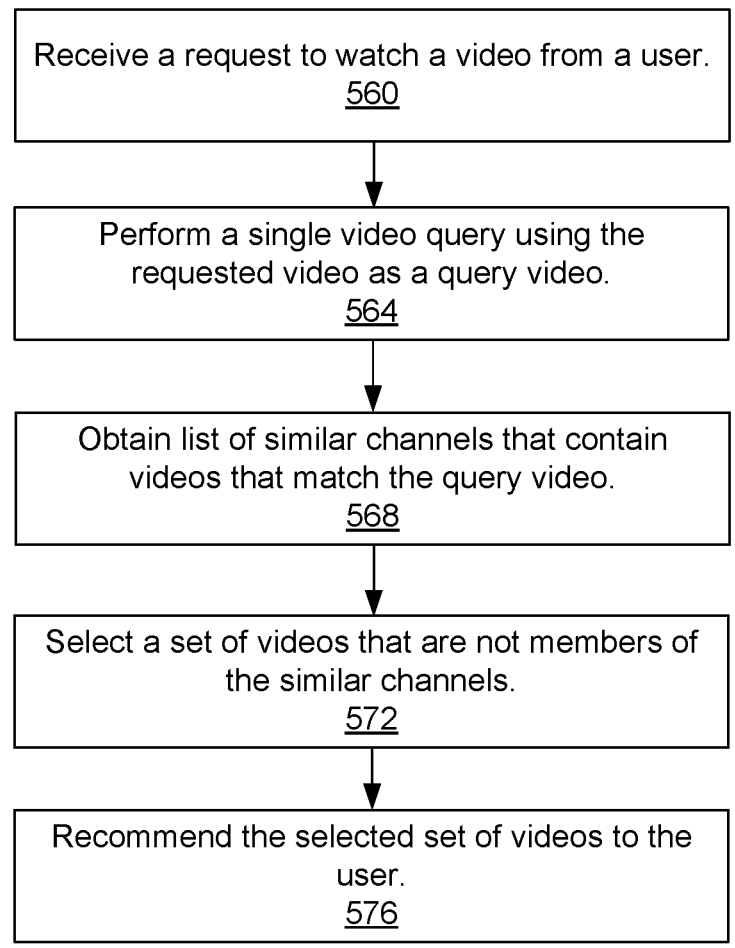
FIG. 5D illustrates an example process of using a single video query to recommend videos for a user to watch next, according to an embodiment.

FIG. 5D illustrates a process of using a single video query to recommend videos for a user to watch next, according to an embodiment. The video hosting system 101 receives 560 a request from a user to watch a particular video. For example, a user can request a video by clicking on a thumbnail of the video to load the video itself. The channel similarity module 250 performs 564 a single video query using the requested video as a query video. The video hosting system 101 obtains 568 a resulting list of similar channels that contain videos that match the query video. To avoid suggesting videos that include repeated content for the user to watch next, the video hosting system selects 572 a set of videos that are not members of the list of similar channels. The video hosting system recommends 576 the selected set of videos to the user, for example by displaying a series of thumbnails of the selected videos next to the video that the user is currently watching in the user interface.

Figure 5E:
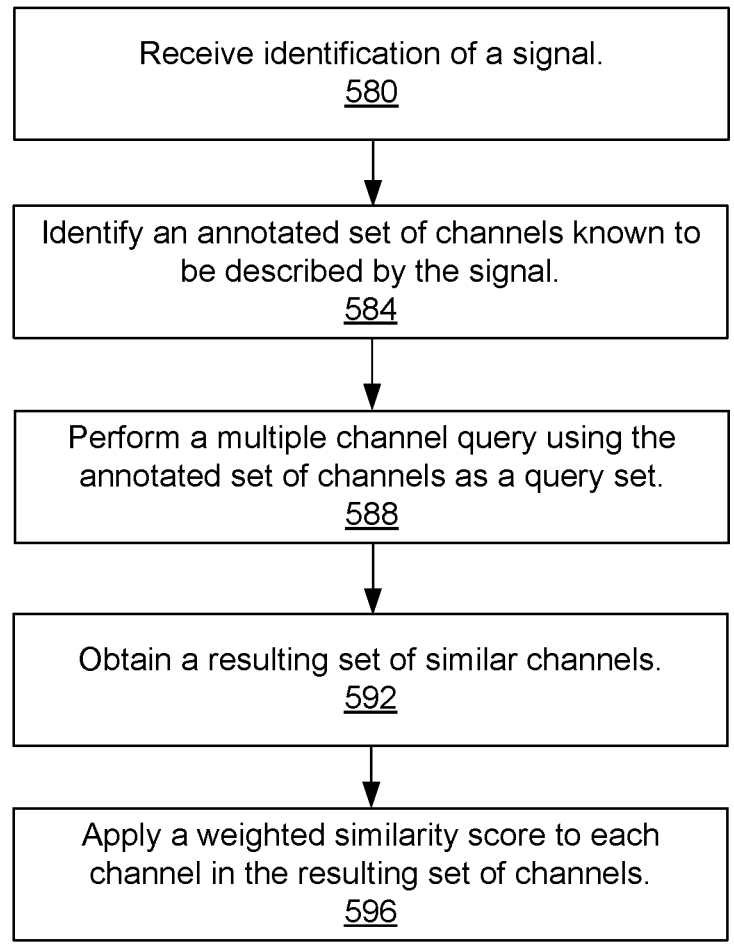
FIG. 5E illustrates an example process of using a multiple channel query to facilitate signal smearing, according to an embodiment.

FIG. 5E illustrates a process of using a multiple channel query to facilitate signal smearing, according to an embodiment. The video hosting system receives 580 identification of a signal. A "signal" is some determinable descriptor of content stored on a video graph. An example of a signal is "content monkeyness," that is, how much monkey-related footage is uploaded to a channel. The video hosting system 101 or its system administrators may be aware of certain channels that have high content monkeyness signals, but may not know about every channel that has some amount of content monkeyness. The video hosting system identifies 584 an annotated set of channels known to be described by the signal. For example, system administrators might have already identified some of the channels that are known to have a significant amount of content monkeyness. The channel similarity module 250 performs 588 a multiple channel query using the annotated set of channels as a query set and obtains 592 a resulting list of similar channels. The video hosting system applies 596 a weighted similarity score to each channel in the resulting set of similar channels, indicating that the channels also have some amount of content monkeyness. Optionally, the process can be repeated such that the resulting set of similar channels are used as a query set in a new multiple channel query and the videos in the list of similar channels produced by the new query are also annotated (e.g., as having some amount of content monkeyness). In this way, a signal can be propagated over a large set of channels and videos without the need for a human to perform manual annotations of each channel or video.

ADDITIONAL CONSIDERATIONS

Some portions of the above description present the feature of the present invention in terms of algorithms and symbolic representations of operations on information. These algorithmic descriptions and representations are the means used by those skilled in the arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method comprising:
    receiving a query video set of at least one query video;
    obtaining, from a video graph based on the query set, a video match set, wherein the video match set contains at least a threshold duration of matching content to at least one video in the query video set;
    identifying a channel associated with each video in the video match set;

determining a similarity score between each video in the query video set and each video in the video match set;

aggregating the similarity scores by channel to generate a channel score for each channel associated with one or more of the videos in the video match set; and sending the channel score for each channel associated with the one or more of the videos in the video match set to the device that provided the query video set.

2. The computer-implemented method of claim 1, wherein the similarity score determines similarity between videos in the query video set and each video in the video match set based on a match duration ratio between the videos.

3. The computer-implemented method of claim 1, wherein the similarity score determines similarity between videos in the query video set and each video in the video match set based on a match view-duration ratio between the videos.

4. The computer-implemented method of claim 1, wherein the similarity score determines similarity between videos in the query video set and each video in the video match set based whether a video match exists between pairs of videos in the video graph.

5. The computer-implemented method of claim 1, wherein aggregating the similarity scores by channel to generate a channel score for each channel associated with one or more of the videos in the video match set includes summing the results of similarity scores determined for each video in each channel associated with one or more of the videos in the video match set.

6. The computer-implemented method of claim 1, wherein aggregating the similarity scores by channel to generate a channel score for each channel associated with one or more of the videos in the video match set includes multiplying the results of similarity scores determined for each video in each channel associated with one or more of the videos in the video match set.

7. The computer-implemented method of claim 1, wherein the query video set of at least one query video includes one query channel.

8. The computer-implemented method of claim 1, wherein the query video set of at least one query video includes two or more query channels.

9. The computer-implemented method of claim 1, further comprising:
receiving a list of abusive videos, wherein the query video set includes the abusive videos in the list of abusive videos;
performing a query using the query video set to obtain a set of channels that are similar to the query video set; and
removing the set of channels from a video hosting system.

10. The computer-implemented method of claim 1, further comprising:
receiving a search query;
determining one or more channels hosting videos that are related to the search query, wherein the query video set includes the one or more channels;
performing a query using the query video set to obtain a set of similar channels having videos that repeat video portions from the videos in the query video set;
removing the set of similar channels from a search results list responsive to the search query; and
presenting the search results list in a user interface.

11. The computer-implemented method of claim 1, further comprising:

obtaining a list of consumed videos, wherein the list of consumed videos is set as the query video set;
performing a query using the query video set to obtain a resulting list of similar channels based on the query video set;
selecting channels that are not included in the resulting list for recommendation; and
presenting the selected channels in a user interface.

12. The computer-implemented method of claim 1, further comprising:
receiving a request for a video, wherein the requested video is set as the query video set;
performing a query using the query video set to obtain a resulting list of similar channels that contain videos that match the requested video in the query video set;
selecting videos for recommendation that are not members of the resulting list of similar channels; and
presenting the selected videos in a user interface.

13. The computer-implemented method of claim 1, further comprising:
receiving identification of a signal, wherein the signal is a determinable descriptor of content stored on the video graph;
identifying an annotated set of channels known to be described by the signal;
performing a query using the annotated set of channels to obtain a resulting list of similar channels; and
applying a weighted similarity score to each channel in the resulting list of similar channels; and
annotating videos in the resulting list of similar channels based on the weighted similarity score.

14. A computer system, comprising:
a computer-readable storage medium comprising executable computer program code for:
receiving a query video set of at least one query video;
obtaining, from a video graph based on the query set, a video match set, wherein the video match set contains at least a threshold duration of matching content to at least one video in the query video set;
identifying a channel associated with each video in the video match set;
determining a similarity score between each video in the query video set and each video in the video match set;
aggregating the similarity scores by channel to generate a channel score for each channel associated with one or more of the videos in the video match set; and
sending the channel score for each channel associated with the one or more of the videos in the video match set to the device that provided the query video set.

15. The computer system of claim 9, wherein the similarity score determines similarity between videos in the query video set and each video in the video match set based on a match duration ratio between the videos.

16. The computer system of claim 9, wherein the similarity score determines similarity between videos in the query video set and each video in the video match set based on a match view-duration ratio between the videos.

17. The computer system of claim 9, wherein the similarity score determines similarity between videos in the query video set and each video in the video match set based whether a video match exists between pairs of videos in the video graph.

18. The computer system of claim 9, wherein aggregating the similarity scores by channel to generate a channel score for each channel associated with one or more of the videos in the video match set includes summing the results of similarity scores determined for each video in each channel associated with one or more of the videos in the video match set.

19. The computer system of claim 9, wherein aggregating the similarity scores by channel to generate a channel score for each channel associated with one or more of the videos in the video match set includes multiplying the results of similarity scores determined for each video in each channel associated with one or more of the videos in the video match set.

20. The computer system of claim 14, further comprising:
receiving a list of abusive videos, wherein the query video set includes the abusive videos in the list of abusive videos;
performing a query using the query video set to obtain a set of channels that are similar to the query video set; and
removing the set of channels from a video hosting system.

21. The computer system of claim 14, further comprising:
receiving a search query;
determining one or more channels hosting videos that are related to the search query, wherein the query video set includes the one or more channels;
performing a query using the query video set to obtain a set of similar channels having videos that repeat video portions from the videos in the query video set;
removing the set of similar channels from a search results list responsive to the search query; and
presenting the search results list in a user interface.

22. The computer system of claim 14, further comprising:
obtaining a list of consumed videos, wherein the list of consumed videos is set as the query video set;
performing a query using the query video set to obtain a resulting list of similar channels based on the query video set;
selecting channels that are not included in the resulting list for recommendation; and
presenting the selected channels in a user interface.

23. The computer system of claim 14, further comprising:
receiving a request for a video, wherein the requested video is set as the query video set;
performing a query using the query video set to obtain a resulting list of similar channels that contain videos that match the requested video in the query video set;
selecting videos for recommendation that are not members of the resulting list of similar channels; and
presenting the selected videos in a user interface.

24. The computer system of claim 14, further comprising:
receiving identification of a signal, wherein the signal is a determinable descriptor of content stored on the video graph;
identifying an annotated set of channels known to be described by the signal;
performing a query using the annotated set of channels to obtain a resulting list of similar channels;
applying a weighted similarity score to each channel in the resulting list of similar channels; and
annotating videos in the resulting list of similar channels based on the weighted similarity score.

25. A non-transitory computer-readable storage medium storing executable computer program instructions, the computer program instructions comprising instructions for:
receiving a query video set of at least one query video;
obtaining, from a video graph based on the query set, a video match set, wherein the video match set contains at least a threshold duration of matching content to at least one video in the query video set;
identifying a channel associated with each video in the video match set;
determining a similarity score between each video in the query video set and each video in the video match set;
aggregating the similarity scores by channel to generate a channel score for each channel associated with one or more of the videos in the video match set; and
sending the channel score for each channel associated with the one or more of the videos in the video match set to the device that provided the query video set.

26. The non-transitory computer-readable storage medium of claim 15, wherein the similarity score determines similarity between videos in the query video set and each video in the video match set based on a match duration ratio between the videos.

27. The non-transitory computer-readable storage medium of claim 15, wherein the similarity score determines similarity between videos in the query video set and each video in the video match set based on a match view-duration ratio between the videos.

28. The non-transitory computer-readable storage medium of claim 15, wherein the similarity score determines similarity between videos in the query video set and each video in the video match set based whether a video match exists between pairs of videos in the video graph.

29. The non-transitory computer-readable storage medium of claim 15, wherein aggregating the similarity scores by channel to generate a channel score for each channel associated with one or more of the videos in the video match set includes summing the results of similarity scores determined for each video in each channel associated with one or more of the videos in the video match set.

30. The non-transitory computer-readable storage medium of claim 15, wherein aggregating the similarity scores by channel to generate a channel score for each channel associated with one or more of the videos in the video match set includes multiplying the results of similarity scores determined for each video in each channel associated with one or more of the videos in the video match set.

31. The non-transitory computer-readable storage medium of claim 25, wherein the computer program instructions further comprises instructions for:
receiving a list of abusive videos, wherein the query video set includes the abusive videos in the list of abusive videos;
performing a query using the query video set to obtain a set of channels that are similar to the query video set; and
removing the set of channels from a video hosting system.

32. The non-transitory computer-readable storage medium of claim 25, wherein the computer program instructions further comprises instructions for:
receiving a search query;
determining one or more channels hosting videos that are related to the search query, wherein the query video set includes the one or more channels;
performing a query using the query video set to obtain a set of similar channels having videos that repeat video portions from the videos in the query video set;
removing the set of similar channels from a search results list responsive to the search query; and
presenting the search results list in a user interface.

33. The non-transitory computer-readable storage medium of claim 25, wherein the computer program instructions further comprises instructions for:
obtaining a list of consumed videos, wherein the list of consumed videos is set as the query video set;

performing a query using the query video set to obtain a resulting list of similar channels based on the query video set;
selecting channels that are not included in the resulting list for recommendation;
and presenting the selected channels in a user interface.

34. The non-transitory computer-readable storage medium of claim 25, wherein the computer program instructions further comprises instructions for:
receiving a request for a video, wherein the requested video is set as the query video set;
performing a query using the query video set to obtain a resulting list of similar channels that contain videos that match the requested video in the query video set;
selecting videos for recommendation that are not members of the resulting list of similar channels; and
presenting the selected videos in a user interface.

35. The non-transitory computer-readable storage medium of claim 25, wherein the computer program instructions further comprises instructions for:
receiving identification of a signal, wherein the signal is a determinable descriptor of content stored on the video graph;
identifying an annotated set of channels known to be described by the signal;
performing a query using the annotated set of channels to obtain a resulting list of similar channels;
applying a weighted similarity score to each channel in the resulting list of similar channels; and
annotating videos in the resulting list of similar channels based on the weighted similarity score.

* * * * *